US007486267B2

(12) United States Patent
Chen et al.

(10) Patent No.: US 7,486,267 B2
(45) Date of Patent: Feb. 3, 2009

(54) OUTPUT DEVICES AND DISPLAY DEVICES UTILIZING SAME

(75) Inventors: Ying-Lieh Chen, Tainan (TW); Lin-Kai Bu, Shanhua Township, Tainan County (TW)

(73) Assignee: Himax Technologies, Inc., Tainan County (TW)

( * ) Notice: Subject to any disclaimer, the term of this patent is extended or adjusted under 35 U.S.C. 154(b) by 573 days.

(21) Appl. No.: 11/042,930

(22) Filed: Jan. 25, 2005

(65) Prior Publication Data

US 2006/0050064 A1 Mar. 9, 2006

(30) Foreign Application Priority Data

Sep. 3, 2004 (TW) .............................. 93126666 A

(51) Int. Cl.
*G09G 3/36* (2006.01)
*G09G 5/00* (2006.01)
*G06F 3/038* (2006.01)

(52) U.S. Cl. .......................... 345/98; 345/204; 345/100

(58) Field of Classification Search .................. 345/98, 345/100, 204; 330/1, 251
See application file for complete search history.

(56) References Cited

U.S. PATENT DOCUMENTS 5,721,563 A * 2/1998 Memida ...................... 345/98
6,456,282 B1 * 9/2002 Karube ...................... 345/204
6,480,178 B1 * 11/2002 Itakura et al. ................. 345/89
6,603,456 B1 * 8/2003 Aoki et al. .................. 345/100

* cited by examiner

*Primary Examiner*—Kevin M Nguyen
(74) *Attorney, Agent, or Firm*—Thomas, Kayden, Horstemeyer & Risley

(57) ABSTRACT

An output device for outputting an output signal. The output device comprises an amplifying unit and a control unit. The amplifying unit has a first input terminal, a second input terminal, and an output terminal outputting the output signal, wherein the amplifying unit is configured with a feedback loop. The control unit configures in the feedback loop and controlled by a control signal. The control unit turns off the feedback according to the control signal for a first period, and the control unit turns on the feedback according to the control signal after the first period.

7 Claims, 7 Drawing Sheets

3

OUTPUT DEVICES AND DISPLAY DEVICES UTILIZING SAME

BACKGROUND

The present invention relates to output devices, and in particular to output devices employed in displays.

Thin film transistor liquid crystal displays (TFT-LCDs) are applied in a variety of electronic devices, such as mobile phones. Recently, the volume of TFT-LCD panels is increased, resulting in the undesired increase of loading on drivers of TFT-LCDs. Moreover, since resolution and operating frequency of large volume TFT-LCD panels are increased, the drivers have to output correct driving signals in shorter time.

In conventional TFT-LCD panels, output devices within drivers have a low slew rate, so that the drivers cannot output correct driving signals in a short time. FIG. 1 shows an output device in a driver of a conventional TFT-LCD panel. The output driver 1 comprises an amplifier 10 and a capacitor 11. The capacitor 11 serves as a compensation element to ensure that the amplifier 10 operates stably while decreasing the slew rate of the amplifier 10. Referring to FIG. 2, a solid line represents an ideal driving signal while a dashed line represents a driving signal SD output by the amplifier 10. Since the capacitor 11 limits the slew rate of the amplifier 10, the rise time of the driving signal SD is longer. Thus, in a large TFT-LCD panel, a driver cannot output correct driving signal SD in a short time, so that the TFT-LCD panel displays incorrect images.

SUMMARY

Output devices are provided. An embodiment of an output device for outputting an output signal comprises an amplifying unit and a control unit. The amplifying unit has a first input terminal, a second input terminal, and an output terminal outputting the output signal, wherein the amplifying unit is configured with a feedback loop. The control unit configures in the feedback loop and controlled by a control signal. The control unit turns off the feedback according to the control signal for a first period, and the control unit turns on the feedback according to the control signal after the first period.

An embodiment of an output device for outputting an output signal comprises an amplifying unit and a control unit. The amplifying unit has a first input terminal, a second input terminal receiving an input terminal, and an output terminal. The control unit is controlled by first and second control signals and has an input terminal coupled to the output terminal of the amplifying unit, and an output terminal outputting the output signal. When the amplifying unit receives the input signal, the control unit controls the output signal to tend towards a second voltage level from a first voltage level in a first period according to the first and the second control signals. The control unit controls the output signal at the second voltage after the first period.

DESCRIPTION OF THE DRAWINGS

The invention will become more fully understood from the detailed description given hereinbelow and the accompanying drawings, given by way of illustration only and thus not intended to be limitative of the invention.

DETAILED DESCRIPTION

Output drivers are provided. In some embodiments, the output drivers have a high slew rate and can be employed in drivers of a display device, so that the drivers output correct driving signals in a short time.

Figure 1:
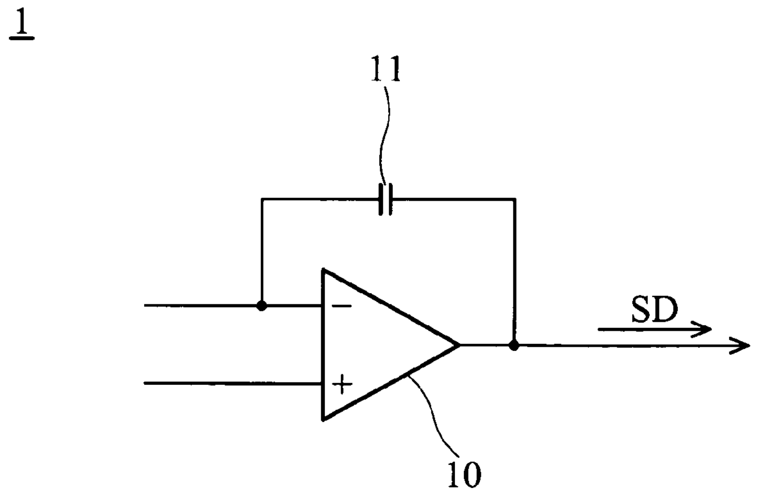
FIG. 1 (RELATED ART)
FIG. 1 shows a conventional output device of a driver in a TFT-LCD panel.
Figure 2:
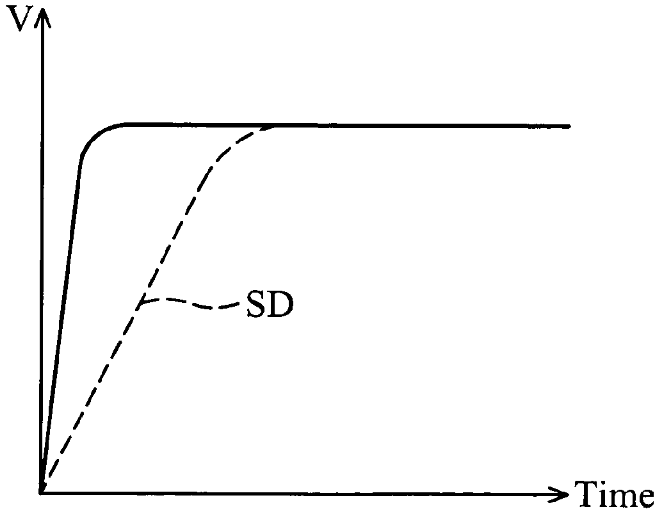
FIG. 2 (RELATED ART)
FIG. 2 shows a driving signal output from the conventional output device in FIG. 1.
Figure 3:
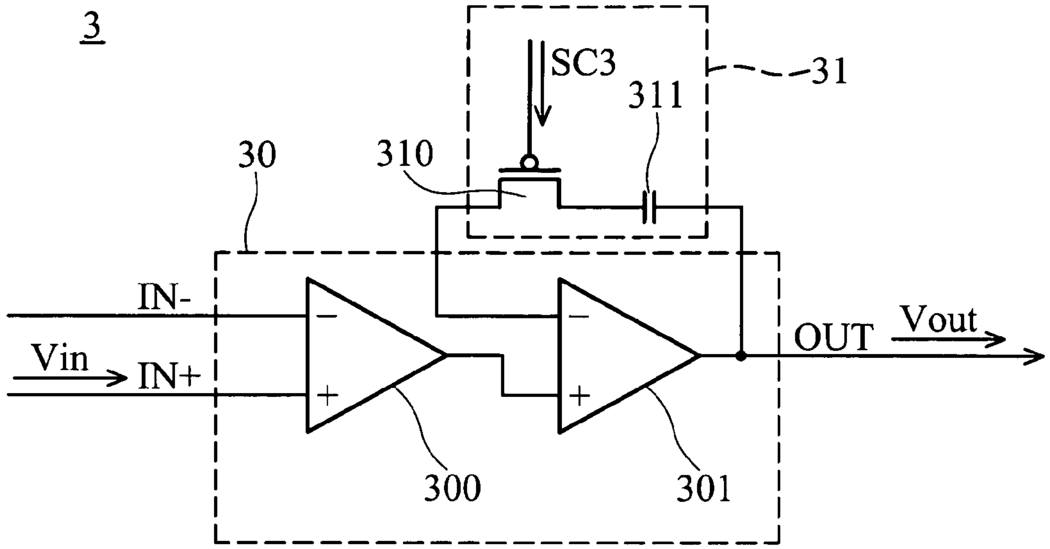
FIG. 3 shows an embodiment of an output device.

In some embodiments, as shown in FIG. 3, an output device 3 comprises an amplifying unit 30 and a control unit 31 and outputs an output signal Vout. The amplifying unit 30 comprises a first-stage amplifier 300 and a second-stage amplifier 301 cascaded with the first-stage amplifier 300. The control unit 31 is configured in a feedback loop of the amplifying unit 30, that is, the control unit 31 is coupled between a negative input terminal and an output terminal of the second-stage amplifier 301 to control the on-state of the feedback loop. A positive input terminal and a negative input terminal of the first-stage amplifier 300 respectively serve as a positive terminal IN+ and a negative input terminal IN− of the amplifying unit 30. The output terminal of the second-stage amplifier 301 serves as an output terminal OUT of the amplifying unit 30. An output terminal of the first-stage amplifier 300 is coupled to a positive input terminal of the second-stage amplifier 301.

Referring to FIG. 3, the control unit 31 comprises a capacitor 311 and a switch. The switch has a control terminal, a first terminal, and a second terminal. In FIG. 3, the switch is a PMOS transistor 310. A gate, a first source/drain, and a second source/drain of the transistor 310 respectively serve as the control terminal, the first terminal, and the second terminal of the switch. The gate of the transistor 310 receives a control signal SC3, The first source/drain thereof is coupled to the negative input terminal of the second-stage amplifier 301. The capacitor 311 is coupled between the second source/drain of the transistor 310 and the output terminal OUT.

Figure 4:
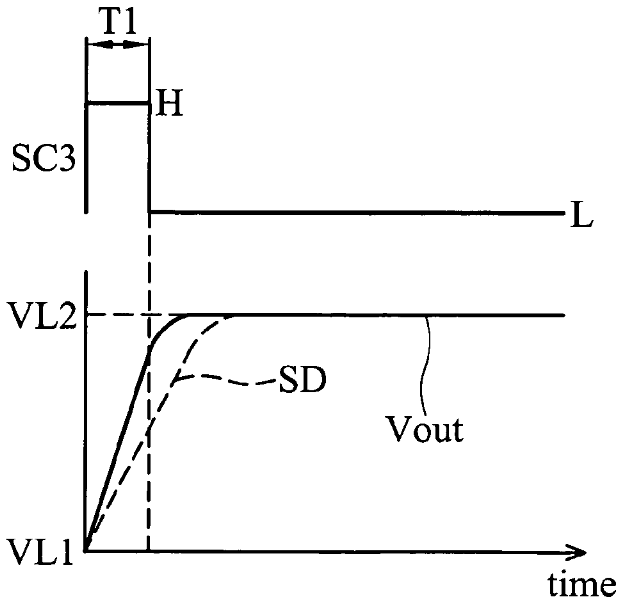
FIG. 4 is a timing chart of the output signal and the control signal in FIG. 3.

FIG. 4 is a timing chart of the output signal and the control signal in FIG. 3. Referring to FIGS. 3 and 4, when the positive terminal IN+ receives an input signal Vin, the control SC3 is at a high voltage level (H) to turn off the transistor 310 for a period T1, so that the feedback loop of the amplifying unit 30 is turned off. Thus, the output signal Vout rapidly tends towards a voltage level VL2 from the voltage level VL1 in the period T1. The control signal SC3 is changed to a low voltage level to turn on the transistor 310, so that the output signal Vout is stably at the voltage level VL2 by the compensation of the capacitor 311 for the amplifying unit 30. The output terminal of the second-stage amplifier 301 is further coupled to the negative input terminal of the first-stage amplifier 300 to form a feedback loop (not shown in FIG. 3).

Figure 5:
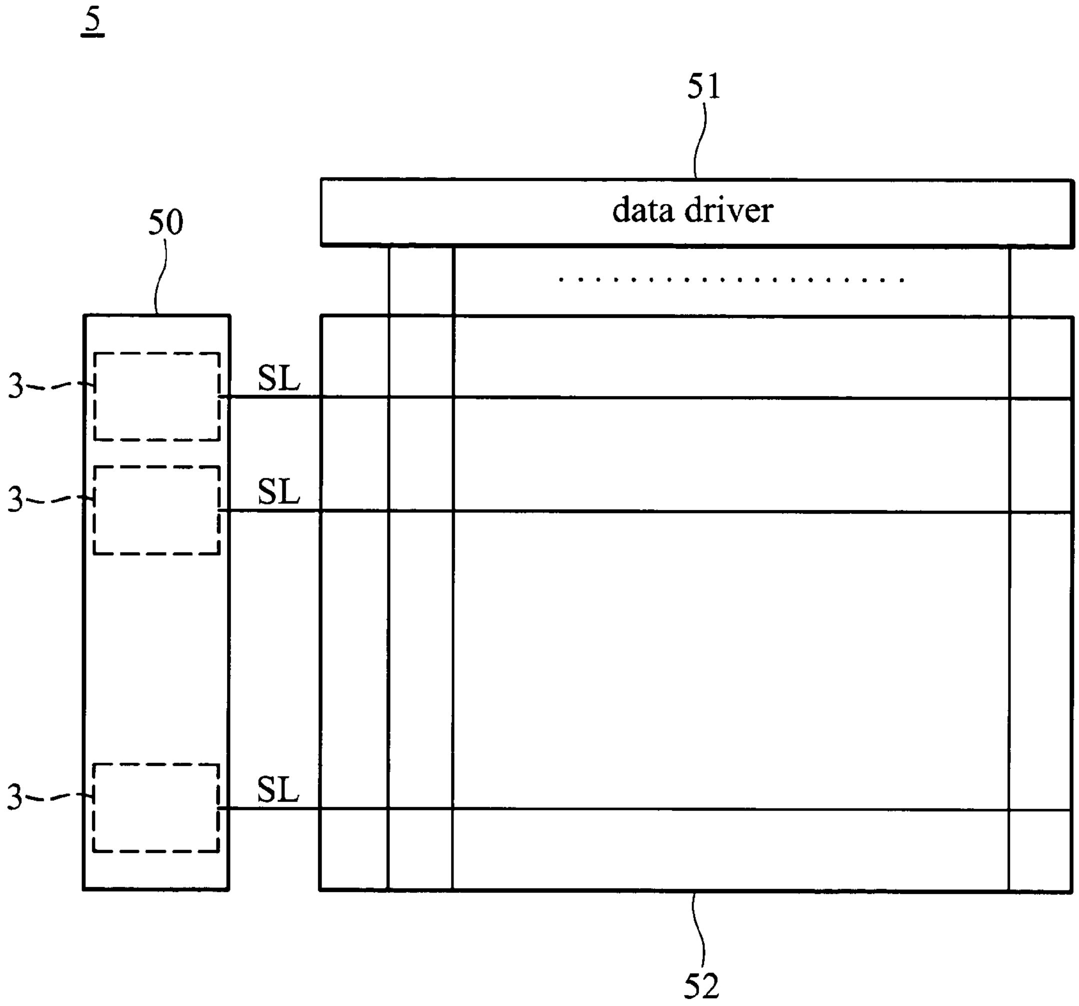
FIG. 5 is a schematic diagram of a display device with an embodiment of an output device.

The output device 3 of FIG. 3 can be employed in drivers of a display device, as shown in FIG. 5. A display device 5 comprises a scan driver 50, a data driver 51, and a panel 52. The output device 3 can be disposed in the scan driver 50, the data driver 51, or both. The scan driver 50 is used as an example in the following description. Referring to FIG. 5, the scan driver 50 comprises a plurality of output devices 3. The output terminal of each output device 3 is coupled to one scan line SL and outputs the output signal Vout to the panel 52 to serve as a scan signal. Referring to FIGS. 3 and 5, one set of the output device 3 and the scan signal SL is used as an example. When the display device 5 starts to drive the scan line SL, the positive input terminal IN+ of the amplifying unit 30 receives the input signal Vin, and the control signal SC3 is at the high voltage level to turn off the transistor 310 for the period T1. Thus, the output signal Vout rapidly tends towards the voltage level VL2 from the voltage level VL1 in the period T1. The control signal SC3 is then changed to the low voltage level to turn on the transistor 310, so that the output signal Vout is stably at the voltage level VL2. Thus, the scan line SL is rapidly driven and the scan signal carried on the scan line SL can reach the voltage level VL2 quickly even though the display device 5 is large.

Figure 6:
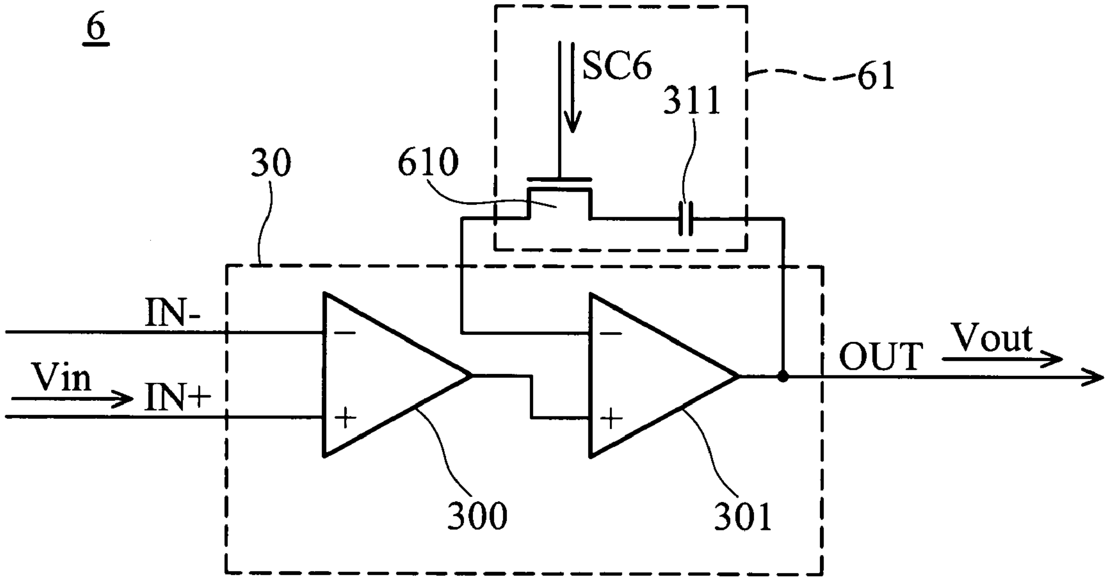
FIG. 6 shows an embodiment of an output device.

In some embodiments, as shown in FIG. 6, an output device 6 is provided. In FIGS. 3 and 6, like reference numbers are used to designate like parts. In a control unit 61 of the output device 6, an NMOS transistor 610 replaces the PMOS transistor 310 of the control unit 31 in the output device 3 in FIG. 3. Thus, a control signal SC6 in FIG. 6 and the control signal SC3 in FIG. 3 are inverted with each other. Moreover, in FIG. 6, the output terminal of the second-stage amplifier 301 is coupled to the negative input terminal of the first-stage amplifier 300 to form a feedback loop (not shown in FIG. 6).

Figure 7:
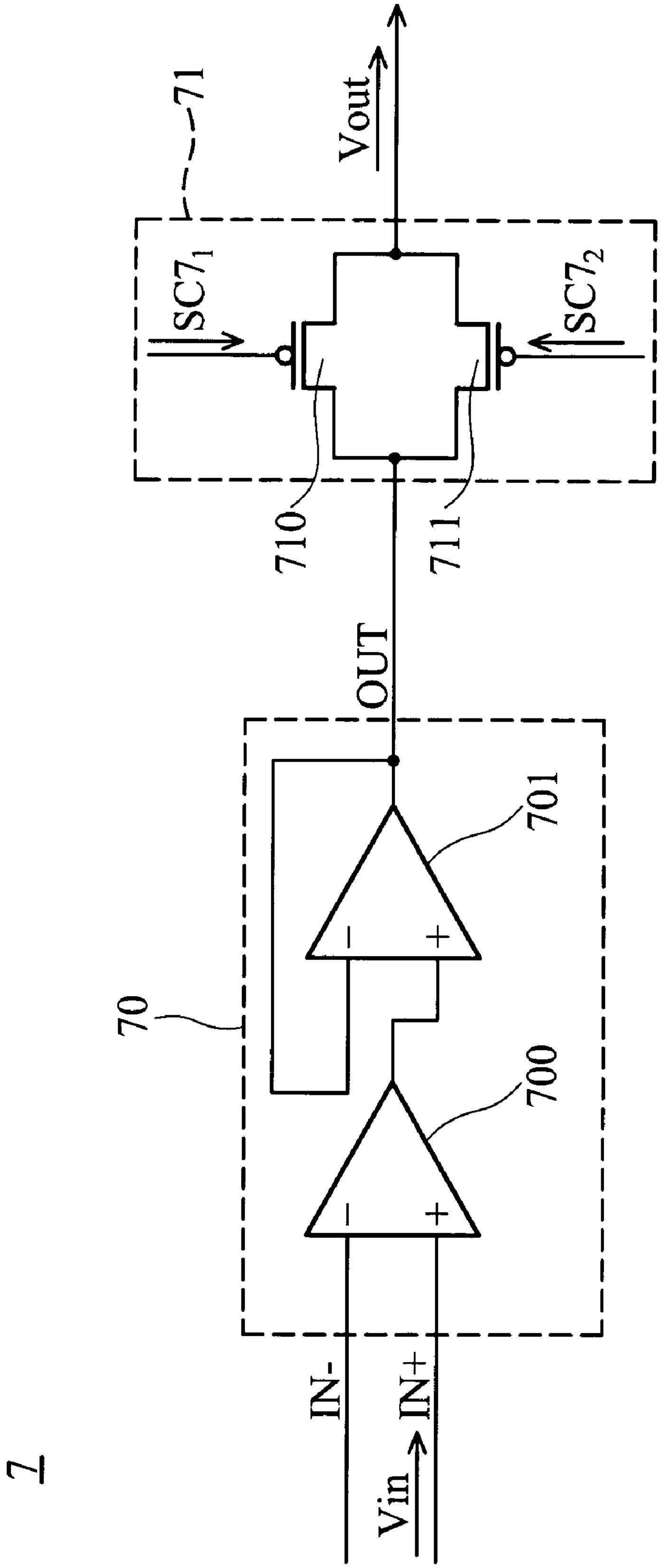
FIG. 7 shows an embodiment of an output device.

In some embodiments, as shown in FIG. 7, an output device 7 is provided. The output device 7 comprises an amplifying unit 70 and a control unit 71 and outputs an output signal Vout. The amplifying unit 70 comprises a first-stage amplifier 700 and a second-stage amplifier 701 cascaded with the first-stage amplifier 700. A positive input terminal and a negative input terminal of the first-stage amplifier 700 respectively serve as a positive terminal IN+ and a negative input terminal IN− of the amplifying unit 70. An output terminal of the second-stage amplifier 701 serves as an output terminal OUT of the amplifying unit 70. An output terminal of the first-stage amplifier 700 is coupled to a positive input terminal of the second-stage amplifier 701, and the output terminal and a negative input terminal of the second-stage amplifier 701 are coupled to each other.

Referring to FIG. 7, an input terminal of the control unit 71 is coupled to the output terminal OUT. The control unit 71 comprises two switches coupled in parallel. Each switch has a control terminal, a first terminal, and a second terminal. In FIG. 7, the switches are respectively PMOS transistors 710 and 711. A gate, a first source/drain, and a second source/drain of each transistor respectively serve as the control terminal, the first terminal, and the second terminal of each switch. The gate of the transistor 710 receives a control signal $SC7_1$, the first source/drain thereof is coupled to the output terminal OUT, and the second source/drain thereof is coupled to an output terminal of the control unit 71. The gate of the transistor 711 receives a control signal $SC7_2$, the first source/drain thereof is coupled to the output terminal OUT, and the second source/drain thereof is coupled to an output terminal of the control unit 71. An internal resistance R2 of the transistor 711 exceeds an internal resistance R1 of the transistor 710. The output terminal of the second-stage amplifier 701 is further coupled to the negative input terminal of the first-stage amplifier 700 to form a feedback loop (not shown in FIG. 7).

Figure 8:
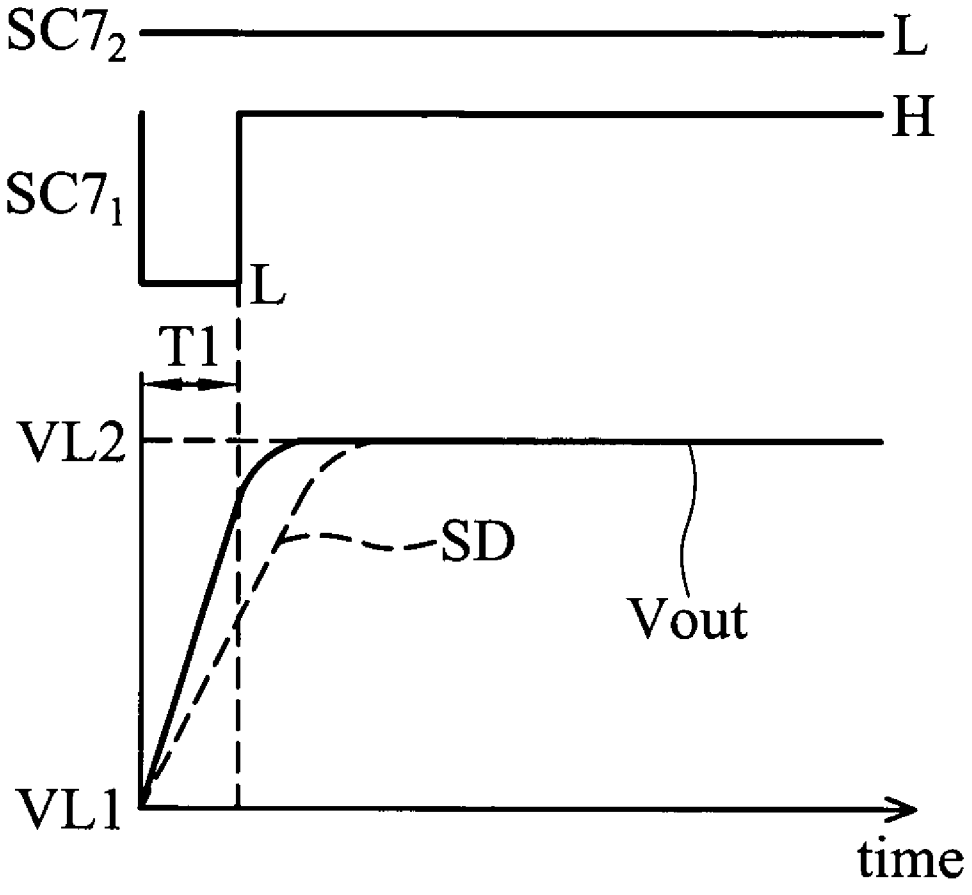
FIG. 8 is a timing chart of the output signal and the control signals in FIG. 7.

FIG. 8 is a timing chart of the output signal and the control signals in FIG. 7. Referring to FIGS. 7 and 8, the control signal $SC7_2$ keeps at a low voltage level (L) to turn on the transistor 711 continuously. When the positive input terminal IN+ of the amplifying unit 70 receives an input terminal Vin, the control signal $SC7_1$ is at the low voltage level (L) to turn on the transistor 710 for a period T1. The total resistance of the amplifying unit 70 equals a resistance (R1//R2) of the parallel transistors 710 and 711, that is, the total resistance of the control unit 71, is less than the internal resistance R1 of the transistor 710. Since the total resistance of the control unit 71 is smaller, the output signal Vout rapidly tends towards a voltage level VL2 from a voltage level VL1 in the period T1. The control signal $SC7_1$ is changed to be at a high voltage level (H) to turn off the transistor 710, so that the total resistance of the control unit 71 is changed to large. Finally, the output signal Vout is stably at the voltage level VL2.

In the output device 7 in FIG. 7, to make the output signal Vout more stable, there is a small capacitor coupled between the output terminal and the negative input terminal of the second-stage amplifier 701 for feedback compensation.

The output device 7 of FIG. 7 can be employed in drivers of a display device. Referring to FIGS. 5 and 7, the output device 7 in FIG. 7 replaces the output devices 3 in FIG. 3. One set of the output device 7 and the scan signal SL is given an example. When the display device 5 starts to drive the scan line SL, the positive input terminal IN+of the amplifying unit 70 receives the input signal Vin, and the control signal $SC7_1$ is at the low voltage level to turn on the transistor 710 for the period T1. Thus, the total resistance of the control unit 71 is smaller, and the output signal Vout rapidly tends towards the voltage level VL2 from the voltage level VL1 in the period T1. The control signal $SC7_1$ is changed to the high voltage level to turn off the transistor 710. At this time, the total resistance of the control unit 71 is changed to large, and the output signal Vout is stably at the voltage level VL2 finally. Thus, the scan line SL is rapidly driven and the scan signal carried on the scan line SL can reach the voltage level VL2 quickly even though the display device 5 is large.

Figure 9:
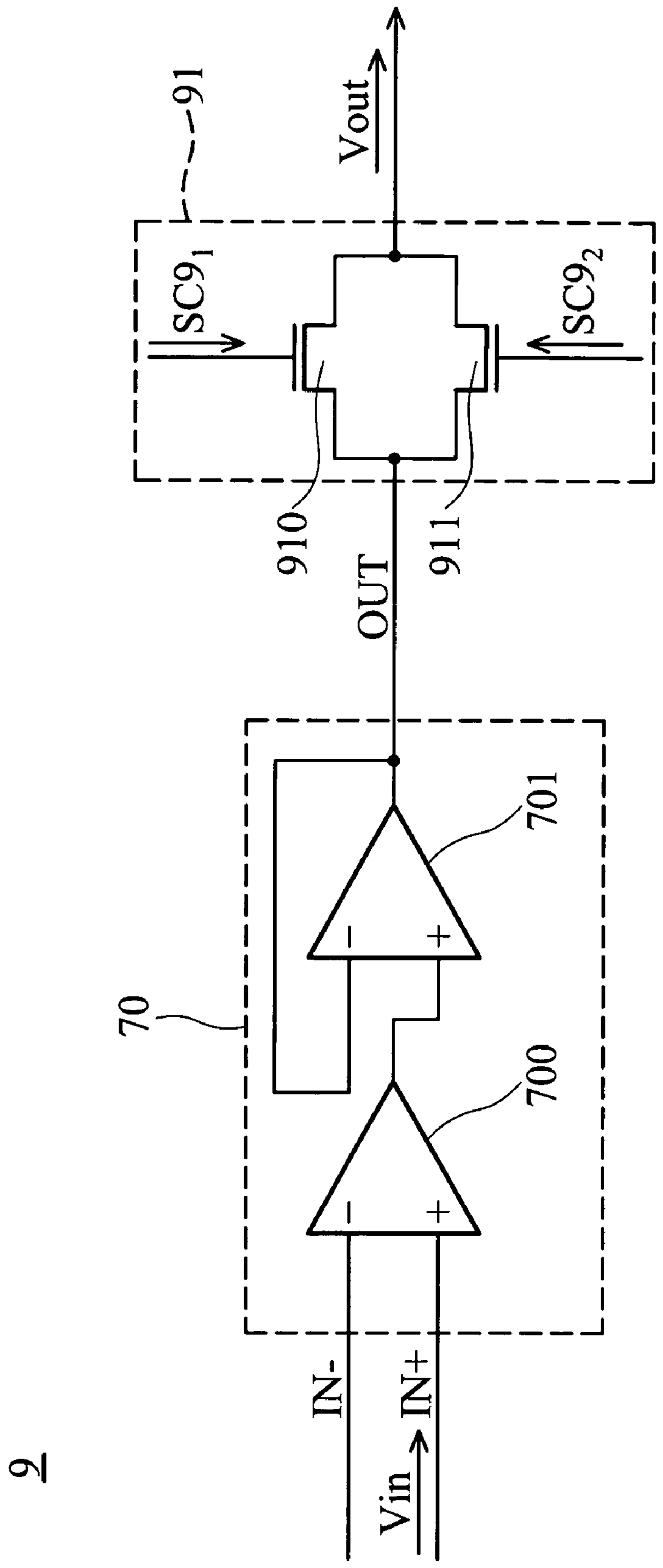
FIG. 9 shows an embodiment of an output device.

In some embodiments, as shown in FIG. 9, an output device 9 is provided. In FIGS. 7 and 9, like reference numbers are used to designate like parts. In a control unit 91 the output device 9, NMOS transistors 910 and 911 replace the PMOS transistors 710 and 711 of the control unit 71 in the output device 7 in FIG. 7. Thus, a control signal $SC9_1$ the control signal $SC7_1$ in FIG. 7 are inverted with each other, and a control signal $SC9_2$ the control signal $SC7_2$ in FIG. 7 are inverted with each other, too. Moreover, in FIG. 9, the output terminal of the second-stage amplifier 701 is coupled to the negative input terminal of the first-stage amplifier 700 to form a feedback loop (not shown in FIG. 9).

Finally, while the invention has been described by way of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A driver for a display device, outputting a plurality of driving signals to drive a plurality of electrode lines, the driver comprising:

a plurality of output devices respectively outputting the driving signal, each comprising:

an amplifying unit having a first input terminal, a second input terminal, and an output terminal outputting the driving signal, wherein the amplifying unit is configured with a feedback loop, wherein the amplifying unit comprises:

a first-stage amplifier having first and second input terminals respectively coupled to the first and the second input terminal of the amplifying unit, and an output terminal;

a second-stage amplifier having a first input terminal, a second input terminal coupled to the output terminal of the first-stage amplifier, and an output terminal coupled to the output terminal of the amplifying unit;

wherein the feedback loop is configured between the first input terminal and the output terminal of the second-stage amplifier; and a control unit configuring in the feedback loop and controlled by a control signal;

wherein when the amplifying unit receives an input signal, the control unit turns off the feedback according to the control signal for a first period so that the amplifying unit rapidly drives the corresponding electrode line toward the driving signal based on the input signal, and then the control unit turns on the feedback according to the control signal after the first period so that the amplifying unit maintains the corresponding electrode line at the driving signal based on the input signal.

2. The driver as claimed in claim 1, wherein the control unit comprises:

a switch having a control terminal receiving the control signal, a first terminal, and a second terminal; and a capacitor coupled to the switch;

wherein the control signal turns off the switch in the first period, and the control signal turns on the switch after the first period.

3. The driver as claimed in claim 2, wherein in the feedback loop, the first terminal of the switch is coupled to the first input terminal of the second-stage amplifier, and the capacitor is coupled between the second terminal of the switch and the output terminal of the second-stage amplifier.

4. A driver for a display device, outputting a plurality of driving signals to drive a plurality of electrode lines, the driver comprising:

a plurality of output devices respectively outputting the driving signal, each comprising:

an amplifying unit having a first input terminal, a second input terminal receiving an input signal, and an output terminal; and a control unit controlled by first and second control signals and having an input terminal coupled to the output terminal of the amplifying unit, and an output terminal outputting the driving signal, wherein the control unit comprises:

a first switch coupled between the input and the output terminals of the control unit and controlled by the first control signal; and a second switch coupled between the input and the output terminals of the control unit and controlled by the second control signal;

wherein the first and the second control signals respectively turn on the first and the second switches in a first period; and wherein the first control signal turns off the first switch and the second control signal turns on the second switch after the first period; and wherein when the amplifying unit receives the input signal, the first switch and the second switch are turned on for the first period so that the control unit controls the driving signal to tend towards a second voltage level of the driving signal from a first voltage level; and wherein the first switch is turned off according to the first control signal after the first period so that the amplifying unit maintains the corresponding electrode line at the second voltage level of the driving signal via the control unit.

5. The driver as claimed in claim 4, wherein an internal resistance of the second switch exceeds that of the first switch.

6. The driver as claimed in claim 4, wherein the amplifying unit comprises:

a first-stage amplifier having first and second input terminals respectively coupled to the first and the second input terminal of the amplifying unit, and an output terminal;

a second-stage amplifier having a first input terminal, a second input terminal coupled to the output terminal of the first-stage amplifier, and an output terminal coupled to the output terminal of the amplifying unit;

wherein the first input terminal and the output terminal of the second-stage amplifier are coupled to each other.

7. The driver as claimed in claim 6, wherein the amplifying unit further comprises a capacitor coupled between the first input terminal and the output terminal of the second-stage amplifier.

* * * * *